(12) United States Patent
Yang

(10) Patent No.: US 9,664,380 B2
(45) Date of Patent: May 30, 2017

(54) GAS CUTTING TIP FOR PREVENTING BACKFIRE

(71) Applicant: Taehan Yang, Incheon (KR)

(72) Inventor: Taehan Yang, Incheon (KR)

( * ) Notice: Subject to any disclaimer, the term of this patent is extended or adjusted under 35 U.S.C. 154(b) by 144 days.

(21) Appl. No.: 14/386,264

(22) PCT Filed: Dec. 17, 2012

(86) PCT No.: PCT/KR2012/011005
§ 371 (c)(1),
(2) Date: Sep. 18, 2014

(87) PCT Pub. No.: WO2013/141466
PCT Pub. Date: Sep. 26, 2013

(65) Prior Publication Data
US 2015/0041561 A1     Feb. 12, 2015

(30) Foreign Application Priority Data
Mar. 22, 2012   (KR) ........................ 10-2012-0029502

(51) Int. Cl.
*B23K 7/10*    (2006.01)
*F23D 14/54*   (2006.01)
(Continued)

(52) U.S. Cl.
CPC .............. *F23D 14/54* (2013.01); *B23K 7/002* (2013.01); *B23K 7/10* (2013.01); *F23D 14/58* (2013.01)

(58) Field of Classification Search
CPC ......... F23D 14/52; F23D 14/54; B23K 7/002; B23K 7/10
(Continued)

(56) References Cited

U.S. PATENT DOCUMENTS 4,664,621 A * 5/1987 Sugisaku ................ F23D 14/82
431/346
4,806,096 A * 2/1989 Kobayashi .............. F23D 14/42
266/48

(Continued)

FOREIGN PATENT DOCUMENTS

JP    61-128526 U    8/1986
JP    62-103323 U    1/1987
(Continued)

OTHER PUBLICATIONS

International Searching Authority, International Search Report of PCT/KR2012/011005 dated Feb. 7, 2013.

*Primary Examiner* — Scott Kastler
(74) *Attorney, Agent, or Firm* — Oliff PLC

(57) ABSTRACT

A gas cutting tip includes a flow path connector coupled to an outlet of a cutter head; an oxygen nozzle coupled to a center of a lower end of the flow path connector; a gas nozzle, wherein a first front end part of the oxygen nozzle protrudes to the outside farther than a second front end part thereof, a semispherical recess is formed inside the second front end part, a waterproof protrusion is formed at an upper end of the gas nozzle, a waterproof groove is formed at a lower end of the flow path connector, a first screw part is formed along an upper periphery of the flow path connector, a coupling nut is coupled to the first screw part, an insertion groove is formed at a center of an upper surface of the coupling nut, and a sealing pad is inserted into the insertion groove.

1 Claim, 5 Drawing Sheets

(51) Int. Cl.
  *F23D 14/58*   (2006.01)
  *B23K 7/00*    (2006.01)
(58) Field of Classification Search
  USPC .......................................................... 266/48
  See application file for complete search history.

(56) References Cited

U.S. PATENT DOCUMENTS

| | | | | |
|---|---|---|---|---|
| 5,407,348 A | * | 4/1995 | Mims ...................... | F23D 14/42 137/454.2 |
| 2015/0041561 A1 | * | 2/2015 | Yang ........................ | B23K 7/10 239/424.5 |

FOREIGN PATENT DOCUMENTS

| KR | 10-1998-0081963 A | 11/1998 |
|---|---|---|
| KR | 10-2001-0010097 A | 2/2001 |

\* cited by examiner

→ : high pressure oxygen
⇐ : low pressure oxygen
← : fuel gas
⇚ : mixed gas

PRIOR ART

GAS CUTTING TIP FOR PREVENTING BACKFIRE

CROSS REFERENCE TO RELATED APPLICATIONS

This is a National Stage of International Application No. PCT/KR2012/011005 filed Dec. 17, 2012, claiming priority based on Korean Patent Application No. 10-2012-0029502 filed Mar. 22, 2012, the contents of all of which are incorporated herein by reference in their entirety.

TECHNICAL FIELD

The present invention relates to a gas cutting tip, and more particularly, to a gas cutting tip for preventing backfire which can prevent in advance a fire and explosion due to backflow of gas from occurring if the tip makes contact with a mother material during the use of a gas cutter and which can block the ingress of fragments of the mother material or foreign objects and has excellent in waterproofness, by forming gas guide grooves at a constant interval on a circumference of a lower end part of mixed gas discharge means coupled to an outlet side of a flow path connector which is coupled to an outlet side of a cutter head and has an oxygen flow path and a gas flow path each formed in the connector and also by forming an oxygen nozzle to be longer than a gas nozzle.

BACKGROUND ART

In general, a gas cutter is used to cut or weld a mother material (2) of metal material.

The gas cutter includes a cutter head (10) that is provided in front of a gas cutter (not illustrated) having an adjusting knob (not illustrated) for adjusting of supply of oxygen and gas fed through feed tubes (not illustrated) connected to oxygen tank and gas tank and that is adjusted by the adjusting knob and discharges, to a gas cutting tip (1), the oxygen and gas fed through an oxygen feed part (12) and a gas feed part (14) connected respectively; and the gas cutting tip (1) which is connected to an outlet side of the cutter head (10) and which mixes and spouts oxygen and gas and cuts the mother material (2) through flame generated by spark ignition.

As illustration in FIG. 1, the gas cutting tip (1) includes a flow path connector (20) in which an oxygen flow path (21) and a gas flow path (22) are formed and which is connected to the outlet side of the cutter head (10), and mixed gas discharge means (30) which is connected to an outlet side of the flow path connector (20) and through which the oxygen and the gas are discharged. The mixed gas discharge means (30) includes an oxygen nozzle (31) which is connected to the oxygen flow path (21) and in which an oxygen discharge hole (32) for discharging the oxygen is formed, and a gas nozzle (35) which is connected to the gas flow path (22) and which discharges the gas through a gas nozzle hole (36) formed by a space resulting from the fact that the gas nozzle is disposed around the oxygen nozzle (31) while spaced apart therefrom.

However, since a front end part (33) of the oxygen nozzle (31) constituting the gas cutting tip (1) is positioned inside the gas nozzle (35) and has a flat end, problems occur as follows: ignited flame is extinguished or flows back along the gas nozzle hole (36) to cause explosion, thereby exposing the risk of fire if the gas cutting tip (1) contacts with the mother material (2) during the use of the gas cutter by user and fragments generated from the mother material (2) or foreign objects enter the inside of the gas nozzle hole (36), thereby making smooth feed of the gas difficult and a part between the gas nozzle (35) and the flow path connector (20) is exposed to water, whereby the feed of the gas is blocked.

SUMMARY OF THE INVENTION

Technical Problems

In order to overcome the problems as described above, an object of the present invention is to provide a gas cutting tip for preventing backfire which can prevent in advance a fire and explosion due to backflow of gas from occurring if the tip makes contact with the mother material during the use of a gas cutter and which can block the ingress of fragments of the mother material or foreign objects and has excellent waterproofness, by forming gas guide grooves at a constant interval on a circumference of a lower end part of mixed gas discharge means coupled to an outlet side of a flow path connector which is coupled to an outlet side of a cutter head and has an oxygen flow path and a gas flow path each formed in the connector and also by forming an oxygen nozzle to be longer than a gas nozzle.

Solution to the Problem

In order to achieve the above-mentioned object, the present invention provides a gas cutting tip for preventing backfire, comprising a flow path connector which is coupled to an outlet side of a cutter head and which has an oxygen flow path for delivering the oxygen centrally formed in the connector and a gas flow path for delivering the gas formed in a rim around the oxygen flow path; an oxygen nozzle which is coupled to a center of a lower end of the flow path connector and in which an oxygen discharge hole is formed so as to discharge the oxygen fed from the oxygen flow path and around a lower end part of which gas guide grooves are formed at a constant interval; and a gas nozzle which is coupled to an outer circumferential surface of the lower end of the flow path connector with the oxygen nozzle housed inside the gas nozzle and in which a gas discharge hole is formed so as to discharge the gas fed from the gas flow path along the gas guide grooves, the gas cutting tip being characterized in that wherein a first front end part of the oxygen nozzle protrudes outward farther than a second front end part of the gas nozzle and has a semispherical shape, a semispherical recess is formed at the second front end part of the gas nozzle so as to smoothly discharge the gas, a waterproof protrusion is formed at an upper end of the gas nozzle, a waterproof groove fit-coupled with the waterproof protrusion is formed at a lower end of the flow path connector, the waterproof protrusion is held in the waterproof groove when the gas nozzle is coupled to the flow path connector by a cap nut, a first threaded part is formed along an upper periphery of the flow path connector, a coupling nut is screwed with the first threaded part, an insertion groove is formed at a center of an upper surface of the coupling nut, and a sealing pad is inserted in the insertion groove and is brought into close contact with a lower end surface of the cutter head.

Effects of the Invention

The present invention configured as above has advantages that it can prevent in advance a fire and explosion due to backflow of gas from occurring if the tip makes contact with a mother material during the use of a gas cutter and which can block the ingress of fragments of the mother material or foreign objects and has excellent in waterproofness

LIST OF REFERENCE NUMERALS

Figure 1:
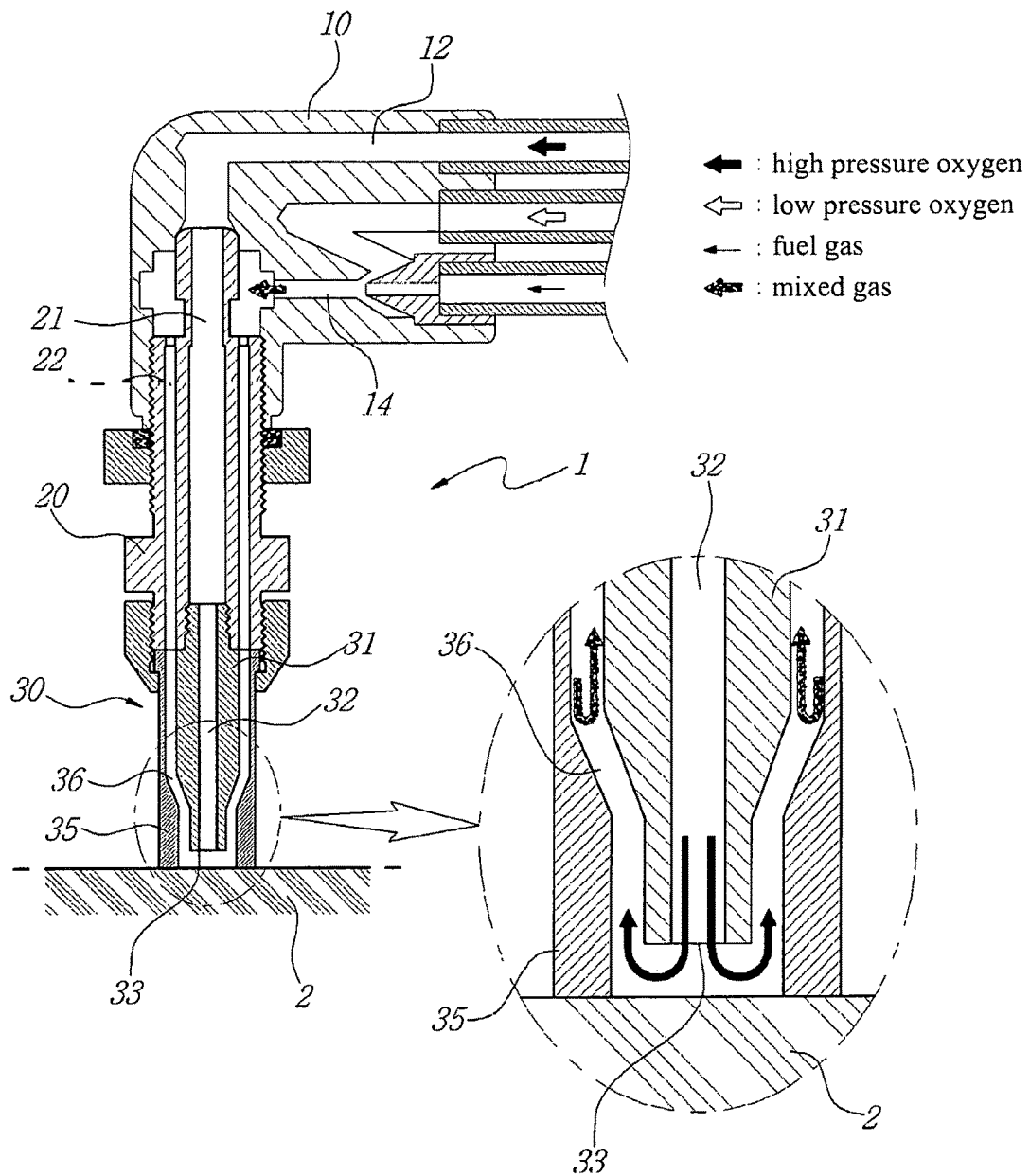
FIG. 1 is a view illustrating a configuration of conventional gas cutting tip.

1: gas cutting tip
2: mother material
10: cutter head
100: mixed gas discharge means
200: flow path connector
210: oxygen flow path
220: gas flow path
230: waterproof groove
300: oxygen nozzle
310: oxygen discharge hole
320: gas guide groove
330: first front end part
400: gas nozzle
410: gas discharge hole
420: waterproof protrusion
430: second front end part

BEST MODES FOR CARRYING OUT THE INVENTION

A gas cutting tip (1) of the present invention includes a flow path connector (200) which is coupled to an outlet side of a cutter head (10) and which has an oxygen flow path (210) for delivering the oxygen centrally formed in the connector and a gas flow path (220) for delivering the gas formed in a rim around the oxygen flow path; an oxygen nozzle (300) which is coupled to a center of a lower end of the flow path connector (200) and in which an oxygen discharge hole (310) is formed so as to discharge oxygen fed from the oxygen flow path (210); and a gas nozzle (400) which is coupled to an outer circumferential surface of the lower end of the flow path connector (200) with the oxygen nozzle (300) housed inside the gas nozzle and in which a gas discharge hole (410) is formed so as to discharge gas fed from the gas flow path (220), wherein gas guide grooves (320) are formed at a constant interval around a lower end part of the oxygen nozzle (300) and the oxygen nozzle is formed to protrude outward from a lower end of the gas nozzle (400).

At this time, a first front end part (330) of the oxygen nozzle (300) is formed in a semispherical shape to make point contact with a mother material (2).

Furthermore, a waterproof protrusion (420) is formed at an upper end of the gas nozzle (400) for preventing water leakage, and a waterproof groove (230) corresponding to the waterproof protrusion (420) is formed at a lower end of the flow path connector (200).

At this time, a semispherical recess (431) is formed at a second front end part (430) of the gas nozzle (400) so as to smoothly discharge the gas.

The present invention configured as above will be described in detail with reference to the attached drawings.

Figure 2:
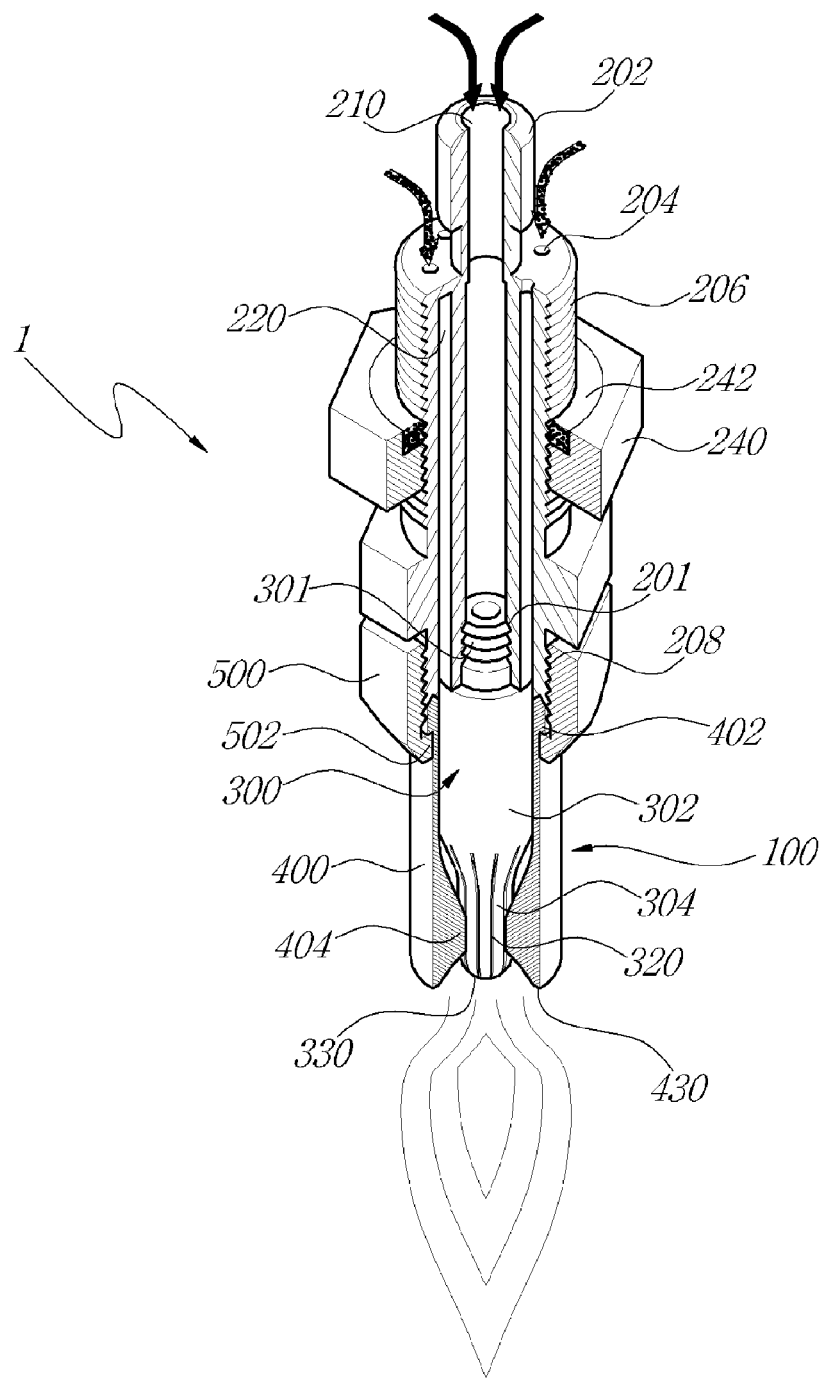
FIG. 2 is a view illustrating a configuration of gas cutting tip for preventing backfire according to the present invention.
Figure 3:
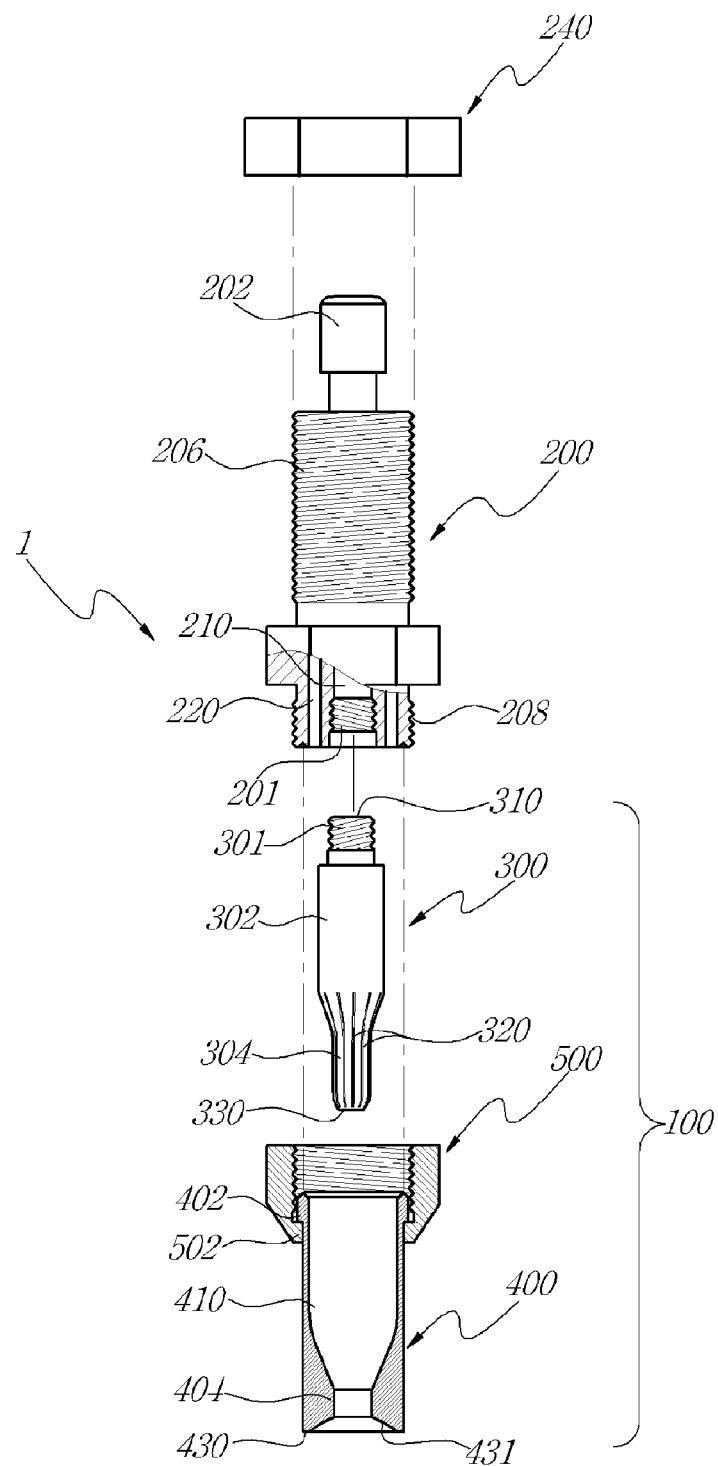
FIG. 3 is an exploded cross-sectional view of the gas cutting tip for preventing backfire according to the present invention.
Figure 4:
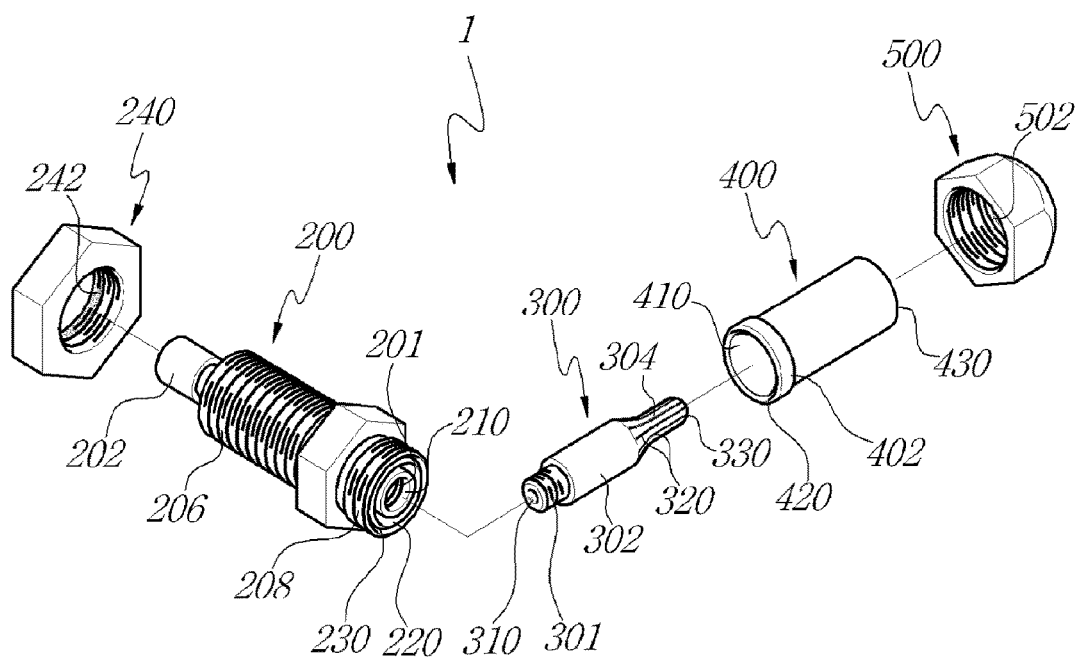
FIG. 4 is an exploded perspective view of the gas cutting tip for preventing backfire according to the present invention.
Figure 5:
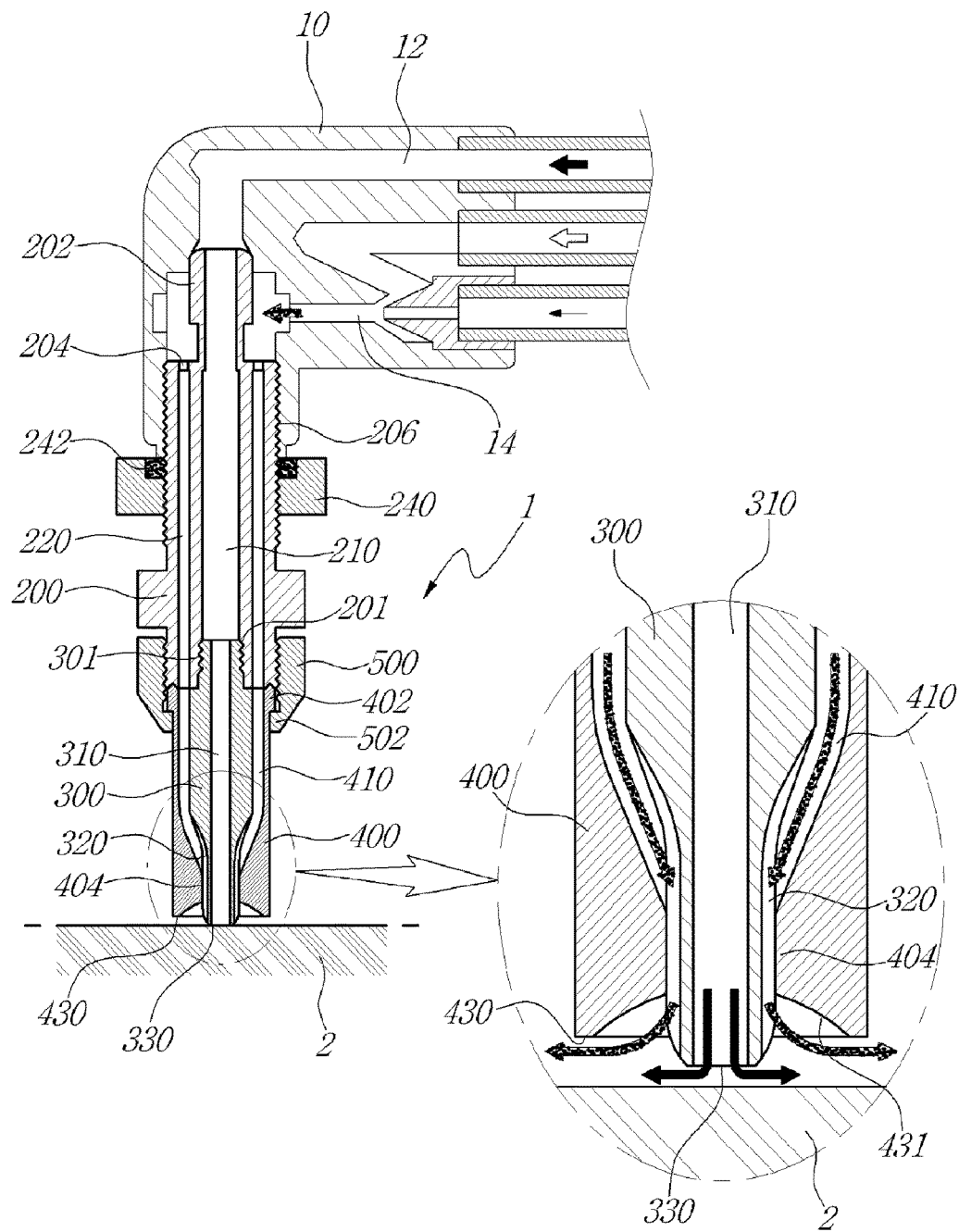
FIG. 5 is a cross-sectional view illustrating an operational state of the cutting tip for preventing backfire according to the present invention.

In the attached drawings, FIG. 2 is a view illustrating a configuration of the gas cutting tip for preventing backfire according to the present invention, FIG. 3 is an exploded cross-sectional view of the gas cutting tip for preventing backfire according to the present invention, FIG. 4 is an exploded perspective view of the gas cutting tip for preventing backfire according to the present invention, and FIG. 5 is a cross-sectional view illustrating an operational state of the cutting tip for preventing backfire according to the present invention.

In the gas cutting tip (1) of the present invention including the flow path connector (200) which is coupled to the outlet side of the cutter head (10) that is provided in front of a gas cutter (not illustrated) having an adjusting knob (not illustrated) for adjusting of supply of oxygen and gas fed through feed tubes (not illustrated) connected to oxygen tank and gas tank and that is adjusted by the adjusting knob and discharges, to the gas cutting tip (1), the oxygen and gas fed through an oxygen feed part (12) and a gas feed part (14) connected respectively, and which has the oxygen flow path (210) for delivering the oxygen centrally formed in the connector and the gas flow path (220) for delivering the oxygen gas formed in a rim around oxygen flow path; the oxygen nozzle (300) which is coupled to the center of the lower end of the flow path connector (200) and in which the oxygen discharge hole (310) is formed so as to discharge the oxygen fed from the oxygen flow path (210); and the gas nozzle (400) which is coupled to the outer circumferential surface of the lower end of the flow path connector (200) with the oxygen nozzle (300) housed inside the gas nozzle and in which the gas discharge hole (410) is formed so as to discharge the gas fed from the gas flow path (220), as illustrated FIGS. 2 to 4, the flow path connector (200) is screwed with the cutter head (10), which connector has the oxygen flow path (210) and the gas flow path (220) formed in a center of the inside and rim of the connector, respectively through which the oxygen and gas fed through the oxygen feed part (12) and the gas feed part (14) each formed in the cutter head (10) are fed.

At this time, a body head (202) extending upward from a central portion of upper end of the flow path connector (200) is coupled to a terminal end of the oxygen feed part (12), and the oxygen flow path (210) is formed downward through a central portion of the body head (202).

Furthermore, a plurality of gas inlet holes (204) are formed on an upper end surface of the flow path connector (200) along a circumferential direction, and a gas flow path (220) is formed downward from the flow path connector below the gas inlet holes (204).

In this way, by the positions of body head (202) and gas inlet holes (204), the oxygen and gas fed through the oxygen feed part (12) and gas feed part (14) are fed toward a lower side of the flow path connector (200) through the oxygen flow path (210) and the gas flow path (220), respectively.

Before the flow path connector (200) is coupled to the cutter head (10), a coupling nut (240) is screwed with a first threaded portion (206) formed along upper circumference of the flow path connector (200). After the first threaded portion (206) is screwed with the cutter head (10), the coupling nut (240) is moved upward along the first threaded portion (206) to be secondarily coupled to the cutter head (10), thereby preventing the flow path connector (200) from departing from the cutter head (10).

It is preferable that a sealing pad (242) of asbestos material is further provided on an upper side of the coupling nut (240) in order to block gas leakage through a gap of the first threaded portion (206).

Here, at the lower end of the flow path connector (200), mixed gas discharge means (100) is further provided which includes the oxygen nozzle (300) with an oxygen discharge hole (310) formed therethrough for discharging the oxygen fed through the oxygen flow path (210) and the gas nozzle (400) with the gas discharge hole (410) formed therethrough for discharging the gas fed through the gas flow path (220).

At this time, the oxygen nozzle (300) includes, over a certain section of its length, a straight tubular portion (302) and a narrowed portion (304) tapering in the form of cone toward a lower side of the oxygen nozzle, which two portions are integrally formed with each other. On a circumference of the narrowed portion (304), a plurality of longitudinal gas guide grooves (320) are formed at a constant interval for guiding the gas fed through the gas flow path (220).

Furthermore, a female threaded portion (201) is formed at the lower end of the flow path connector (200), and a male threaded portion (301) is formed at an upper end of the oxygen nozzle (300), wherein the two threaded portions are screwed with each other.

The gas guide grooves (320) smoothly discharge the gas discharged through a gas discharge hole (410) described later and allow the gas to be radially dispersed.

Next, the gas nozzle (400) with the gas discharge hole (410) formed therethrough is disposed around an outer circumference of the oxygen nozzle (300) with a distance from the nozzle so as to discharge the gas fed through the gas flow path (220).

A catching protrusion (402) is formed on an outer circumference of upper end of the gas nozzle (400), and the cap nut (500) is coupled to a second threaded portion (208) formed on a circumference of the lower end of the flow path connector (200). At this time, a caught portion (502) formed at a lower end of the cap nut (500) is caught by the catching protrusion (402), whereby the gas nozzle (400) is coupled to the lower end of the flow path connector (200).

At this time, a waterproof protrusion (420) is protrudingly formed at an upper end of the gas nozzle (400), and a waterproof groove (230) corresponding to the waterproof protrusion (420) is formed at the lower end of the flow path connector (200). The waterproof protrusion (420) is held in the waterproof groove (230) when the gas nozzle (400) is coupled to the flow path connector (200) by the cap nut (500).

Furthermore, gas guide protrusions (404) are formed on an inner circumference of lower end of the gas nozzle (400) and closely contact with the gas guide grooves (320).

Here, the first front end part (330) of the oxygen nozzle (300) protrudes farther than the second front end part (430) of the gas nozzle (400), and it is preferable that the first front end part (330) is formed in a semispherical shape so as to make point contact with the mother material (2).

Furthermore, the semispherical recess (431) is formed at the second front end part (430) of the gas nozzle (400) so as to smoothly discharge the gas discharged along the gas guide grooves (320) and evenly disperse the flame.

Referring to FIG. 5, operational state of the gas cutting tip (1) of the present invention configured as above will be described.

As illustrated in FIG. 5, the oxygen and gas fed through the oxygen feed part (12) and gas feed part (14) provided in the cutter head (10), respectively are each fed toward the lower end of the flow path connector (200) by the oxygen flow path (210) and gas flow path (220) formed in the flow path connector (200).

The oxygen is discharged toward the first front end part (330) through the oxygen nozzle (300) coupled to the lower end of the flow path connector (200).

Then, the gas nozzle (400) coupled to the flow path connector (200) by the cap nut (500) has a cylindrical shape, and the gas fed by the gas flow path (220) is discharged toward the second front end part (430) of the gas nozzle (400) through a space between the gas nozzle and the oxygen nozzle (300).

At this time, the gas is discharged toward the second front end part (430) by the gas guide grooves (320) formed on the circumference of the narrowed portion (304) and the gas guide protrusions (404) formed in the gas nozzle (404), and meets with the oxygen discharged from the first front end part (330) to generate a high-pressure flame.

Here, if the first front end part (330) protruding farther than the second front end part (430) of the gas nozzle (400) contacts with the mother material (2), the oxygen outwardly spurts toward remaining portion other than contact portion along a surface of the mother material since the first front end part (330) makes point contact with the mother material (2). Likewise, the gas outwardly spurts along the recess (431) formed at the second front end part (430) through an outlet formed by the gas guide grooves (320) and the gas guide protrusions (404).

In this way, the gas cutting tip (1) of the present invention can prevent in advance a fire and explosion due to a backflow of the gas from occurring if the tip makes contact with the mother material during the use of the gas cutter, and can block the ingress of fragments of the mother material or foreign objects.

Furthermore, the ingress of water from the outside can be blocked by the waterproof groove (230) formed at the flow path connector (200) and the waterproof protrusion (420) formed at the gas nozzle (400).

Although the present invention has been illustrated and described in connection with a specific embodiment, those skilled in the art will easily appreciate that various modifications and alterations may be made without departing from the concept and scope of the present invention as defined in the claims, which modifications and alterations are intended to fall within the scope of claims.

INDUSTRIAL APPLICABILITY

The gas cutting tip for preventing backfire of the present invention can prevent in advance the fire and explosion due to the backflow of the gas from occurring if the tip makes contact with the mother material during the use of the gas cutter, can block the ingress of fragments of the mother material or foreign objects, and has excellent waterproofness.

What is claimed is:
1. A gas cutting tip for preventing backfire, comprising:
   flow path connector which is coupled to an outlet side of
      a cutter head and which has an oxygen flow path for
         delivering the oxygen centrally formed in the connector and a gas flow path for delivering the gas formed in a rim around the oxygen flow path;

an oxygen nozzle which is coupled to a center of a lower end of the flow path connector and in which an oxygen discharge hole is formed so as to discharge the oxygen fed from the oxygen flow path and around a lower end part of which gas guide groove are formed at a constant interval; and a gas nozzle which is coupled to an outer circumferential surface of the lower end of the flow path connector with the oxygen nozzle housed inside the gas nozzle and in which a gas discharge hole is formed so as to discharge the gas fed from the gas flow path along the gas guide grooves, wherein a first front end part of the oxygen nozzle protrudes outward farther than a second front end part of the gas nozzle and has a semispherical shape, a semispherical recess is formed at the second front end part of the gas nozzle so as to smoothly discharge the gas, a waterproof protrusion is formed at an upper end of the gas nozzle, a waterproof groove fit-coupled with the waterproof protrusion is formed at a lower end of the flow path connector, the waterproof protrusion is held in the waterproof groove when the gas nozzle is coupled to the flow path connector by a cap nut, a first threaded part is formed along an upper periphery of the flow path connector, a coupling nut is screwed with the first threaded part, an insertion groove is formed at a center of an upper surface of the coupling nut, and a sealing pad is inserted in the insertion groove and is brought into close contact with a lower end surface of the cutter head.

* * * * *